United States Patent [19]

Gefroh

[11] Patent Number: 4,793,626
[45] Date of Patent: Dec. 27, 1988

[54] TRAILER HITCH
[76] Inventor: John A. Gefroh, Rte. 2, Box 63, Rolla, N. Dak. 58367
[21] Appl. No.: 39,217
[22] Filed: Apr. 17, 1987
[51] Int. Cl.$^4$ .............................................. B60D 1/00
[52] U.S. Cl. ................................ 280/478 R; 172/275; 280/509; 280/510
[58] Field of Search ............... 280/477, 478 R, 478 A, 280/478 B, 482, 508, 509, 510; 172/275

[56] References Cited

U.S. PATENT DOCUMENTS

| | | | |
|---|---|---|---|
| 1,246,666 | 11/1917 | Sherman | 280/510 |
| 2,393,657 | 1/1946 | Rudnick | 280/477 |
| 2,556,748 | 6/1951 | Buckley | 280/510 X |
| 2,818,276 | 12/1957 | Sprang | 280/477 X |
| 3,891,237 | 6/1975 | Allen | 280/477 |
| 3,912,302 | 10/1975 | Patterson | 280/477 |
| 4,131,295 | 12/1978 | Highberger | 280/477 X |

FOREIGN PATENT DOCUMENTS

| | | | |
|---|---|---|---|
| 445103 | 11/1926 | Fed. Rep. of Germany | 280/478 R |
| 710947 | 6/1954 | United Kingdom | 280/477 |

Primary Examiner—David M. Mitchell
Assistant Examiner—Charles R. Watts
Attorney, Agent, or Firm—Peterson, Wicks, Nemer & Kamrath

[57] ABSTRACT

The trailer hitch comprises a channel-shaped body having a bottom wall containing therein two longitudinally offset holes and an elongated slot located forwardly of said holes. Associated with the slot is a trigger mechanism that can be rotated into a perpendicular relationship with the bottom wall of the channel-shaped body so as to flex a resilient strip downwardly. The resilient strip has mounted thereon a U-shaped rod that provides a pair of pins that project upwardly from the upper side of said strip, the pins being aligned with the holes in the bottom wall. A tongue member has a pair of notches longitudinally offset in its marginal edges so that when the tongue member is pulled forwardly to strike the trigger mechanism, the trigger mechanism is rotated from its generally perpendicular relationship into a parallel relationship so that the resiliently mounted strip member can flex upwardly with the result that the pins extend into the notches formed in the edges of the tongue member to latch the tongue member to the channel-shaped body.

17 Claims, 4 Drawing Sheets

TRAILER HITCH

BACKGROUND OF THE INVENTION

1. Field of the Invention

This invention relates generally to trailer hitches, and pertains more particularly to a hitch utilizing a trigger-like action to effect the coupling.

2. Description of the Prior Art

A large number of hitches have been devised, usually being designed so as to overcome a variety of problems. To some degree, the type of service to which the hitch it to be put dictates the construction thereof. While some hitches are designed for general utility, others have special attributes that render them especially suitable for towing agricultural implements. Farm equipment by and large has to be coupled and uncoupled rather frequently and by just the farmer or rancher without assistance by others. Hence, the need has existed for a hitch that can be coupled without the farmer or rancher climbing down from the towing vehicle to effect the coupling, as well as not requiring relative alignment of the vehicle to be towed with the towing vehicle. Furthermore, farm implements, in particular, can be quite heavy and not easily moved by a single person. When only one person is available, and even when two are present, it has been quite difficult to establish a fairly precise alignment between the towing vehicle and the implement to be towed before the two can be coupled together.

The problem has been recognized and at least several attempts have been made to alleviate the problem. Even where an automatic coupling action is achieved, it frequently requires a relatively precise alignment of the towing vehicle with the implement that is to be coupled and towed. Inasmuch as various shortcomings still exist with respect to prior art hitches, the need for a reliable hitch that can be conveniently connected and disconnected still remains.

Several patented hitch constructions that have come to my attention are disclosed in U.S. Pat. No. 2,393,657, granted on Jan. 29, 1946 to Herbert Rudnick for "COUPLING DEVICE;" U.S. Pat. No. 2,556,748, issued on June 12, 1951 to Eugene W. Buckley for "AUTOMATIC VEHICLE HITCH," and U.S. Pat. No. 3,891,237, granted on June 24, 1975 to Bill Allen for "TRAILER HITCH." These hitches are examples of hitches requiring a fairly precise alignment of the hitch components before undertaking the actual coupling procedure.

SUMMARY OF THE INVENTION

Accordingly, one object of the invention is to provide a trailer hitch that enables the implement to be towed to be coupled to the towing vehicle without having to precisely align one with the other.

Another object of my invention is to provide a trailer hitch that will be easy to couple in that it can be accomplished by the operator of the towing vehicle while seated on the towing vehicle.

The invention also has for an object a hitch that can be readily uncoupled, although the operator of the towing vehicle is required to leave his seat in order to accomplish the uncoupling.

Yet another object of the invention is to provide a hitch that does not rely upon gravity to effect engagement of any of the parts of the hitch, gravity being somewhat undependable, especially where the hitch is used where mud and dirt can collect thereon.

Still further, an object of the invention is to provide a hitch that is exceptionally rugged and long lasting.

Still further, it is contemplated that the hitch can be made relatively inexpensively.

An additional object is to provide a hitch that can be manufactured in a variety of sizes, depending upon the particular use to which the hitch is to be put. In this regard, an aim of the invention is to provide a fairly sizeable hitch, one capable of shouldering heavy pulling loads, yet permitting fabrication thereof on a smaller scale if only relatively light towing loads are likely to be encountered.

Briefly, my invention contemplates a hitch comprised of a channel-shaped body that is mounted on the traction vehicle. The channel-shaped body is equipped with a trigger mechanism that normally maintains one end of a resiliently attached strip in a spaced relationship with the underside of the channel-shaped body. By reason of a pair of pins integral with a U-shaped rod carried on the resiliently mounted strip, the pins are capable of automatically engaging notches in the opposite side edges of a tongue member when the tongue member is advanced forwardly into the channel-shaped body sufficiently so as to actuate the trigger mechanism in a manner such that the resiliently attached strip flexes upwardly to allow the upper ends of the pins to engage in the notches. The triggering action is achieved by means of a cable connected to the tongue member so that the cable can be pulled forwardly through the agency of a winch or the like that is made readily accessible to the operator. In this way, the operator does not have to leave his seat on the towing vehicle in order to couple the towing vehicle to the trailing vehicle that is be towed.

DESCRIPTION OF THE PREFERRED EMBODIMENT

Although my trailer hitch can be used for coupling various types of traction and trailer vehicles together, it will have considerable utility in the coupling of different types of farm implements to various types to towing vehicles. Consequently, for the sake of description and facile understanding of my invention, the rear portion of a cultivator 10 has been illustrated in FIG. 1, the cultivator 10 having downwardly extending curved tines 12. There is also shown a rearwardly extending drawbar 14.

Whereas the cultivator 10 constitutes the towing vehicle, although in practice it is in turn towed by a tractor, problems have arisen in the past with respect to coupling field tanks containing anhydrous ammonia therein to the cultivators they are to trail. Therefore, the forward portion of a liquid fertilizer mobile field tank vehicle appears in FIG. 1 and has been indicated generally by the reference numeral 16. Just one of its wheels 18 is visible. The vehicle 16 includes a tank 20 that contains the fertilizer to be dispensed. The vehicle 16 additionally includes a forwardly extending drawbar 22 having a clevis 24 with vertically aligned holes 25 through which an eye pin 26 can be inserted.

Figures 3, 4, 5, 6:
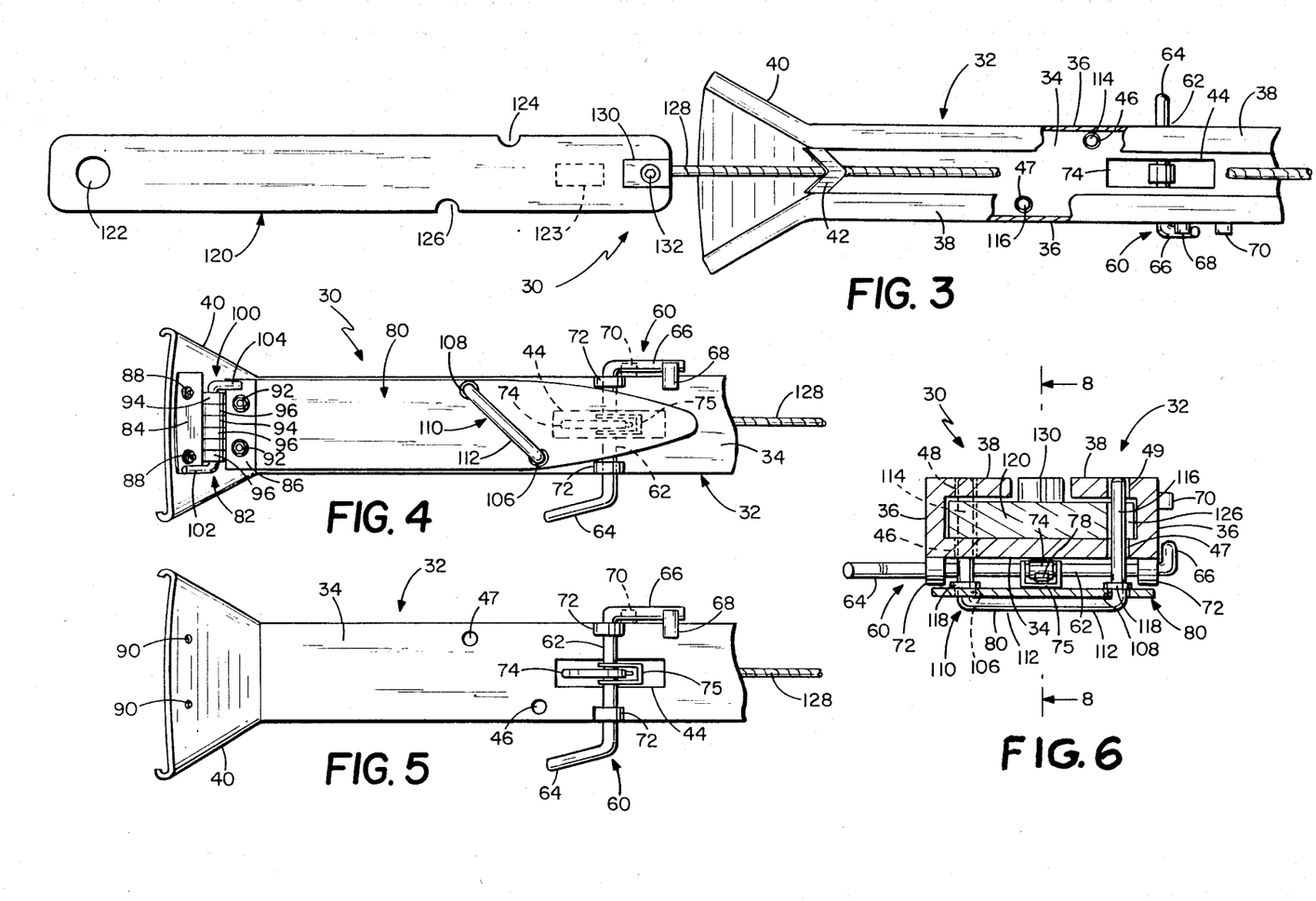
FIG. 3 is a considerably enlarged top plan view corresponding to FIG. 1.
FIG. 4 is a bottom plan view of the coupled hitch as it appears in FIG. 2.
FIG. 5 is a bottom plan view corresponding to FIG. 4 but with the underlying resiliently attached strip removed.
FIG. 6 is an enlarged sectional view taken in the direction of line 6—6 of FIG. 2.

The trailer hitch exemplifying my invention has been denoted in its entirety by the reference numeral 30. The hitch 30 comprises a channel-shaped body 32 having a bottom wall 34, upstanding side walls 36 and inturned flanges 38 at the upper edges of the side walls 36. A flared guideway or ramp 40 is integral with the entrance end of the channel-shaped body 32. Also, as can be seen from FIG. 3, there is a V-shaped cable guide 42. It is to be observed that the bottom wall 34 has an elongated slot 44 formed therein and also a pair of holes or openings 46 and 47. For a purpose later explained, the holes 46, 47 are not abreast of each other, the hole 46 being more forwardly located than the hole 47. FIGS. 3 and 5 show this skewed arrangement of the holes 46 and 47. The flanges 38, as can be seen from FIG. 6, have holes or openings 48 and 49, the hole 48 being vertically aligned with the hole 46 and the hole 49 vertically aligned with the hole 47.

Figure 1:
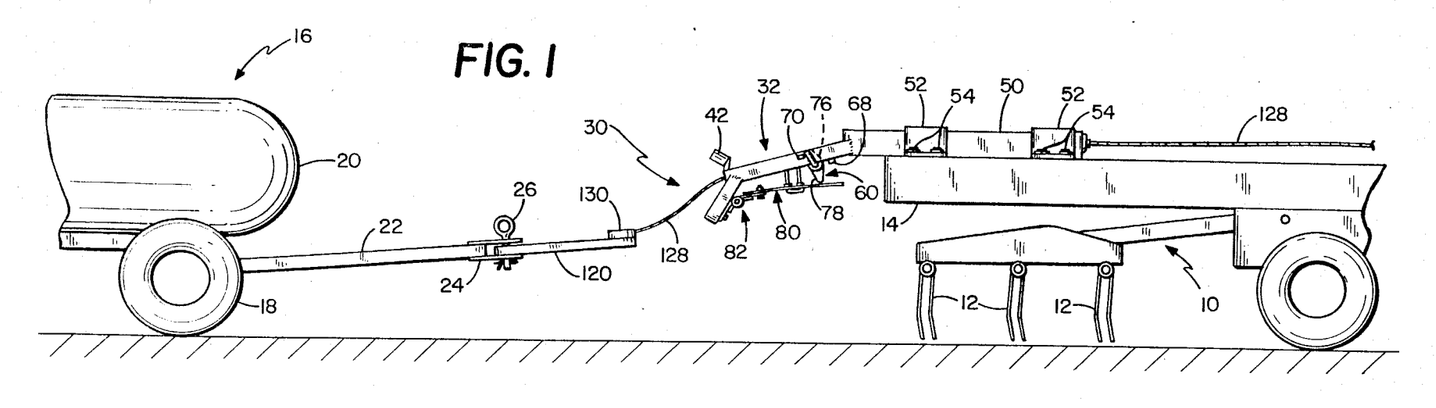
FIG. 1 is a side elevational view of my trailer hitch, the hitch being shown in the process of coupling an anhydrous ammonia field tank to a cultivator.

From FIG. 1, it will be discerned that the forward end of the channel-shaped body 32 has a mounting arm 50 integral therewith. The arm 50 enables the channel-shaped body 32 to be mounted on the drawbar 14 through the agency of a pair of anchors 52, the anchors 52 being attached to the drawbar 14 by means of bolts 54. To avoid undue shock, it is desirable that the arm 50 be capable of moving forwardly to some degree on the drawbar 14 at the end of the coupling procedure, buffered by a coil spring (not shown).

Playing an important role in the practicing of my invention is a trigger mechanism 60. The mechanism 60 includes a transverse shaft 62 having a first arm 64 serving as a handle and a second arm 66 serving as a stop in that it can swing through only an angle limited by a pair of lugs 68 and 70 welded to the body 32. The shaft 62 is journaled for rotation by means of a pair of laterally spaced bearings 72 secured to the underside of the bottom wall 34.

Figure 2:
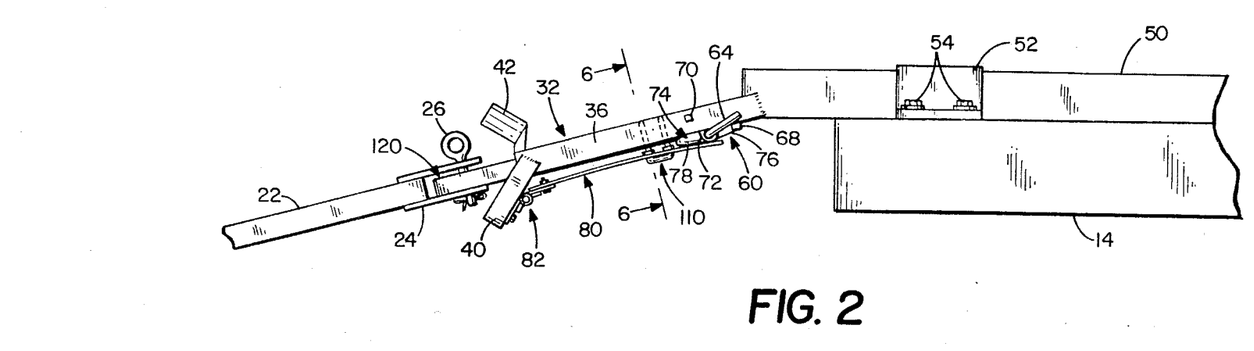
FIG. 2 is an enlarged side elevational view corresponding to FIG. 1 but with the hitch fully coupled.

The trigger mechanism 60 also includes an actuating member 74 that is welded to the mid portion of the shaft 62. In this way, the actuating member 74, being a straight member, can be oriented in either a perpendicular (FIG 1; see also FIGS. 7, 9, 11 and 12) relationship with the bottom wall 34 or in a parallel (FIG. 2; see also FIG. 8) relationship therewith.

The trigger mechansim 60 additionally includes a pivotal trigger member 75 having laterally spaced side walls 76 that straddle the member 74, the side walls 76 having circular holes at 62a therein through which the shaft 62 loosely extends. In other words, the trigger member 75 is free to pivot on the shaft 62, whereas the actuating member 74 is fixedly mounted thereon. The side walls 76 have straight edges 76a and curved edges 76b. Conforming to the curvature of the edges 76b is a rear curved wall 77 that provides a cam surface 77a. The trigger member 75 is normally biased into a straight line relationship with the actuating member 74 by means of a leaf spring 78 having one end portion thereof received in a notch 79 (see FIGS. 7-11 and 13 for the notch 79).

Also of importance in realizing the benefits of my invention is a strip 80 that is resiliently attached at one end in a fixed relationship with the bottom wall 34, actually being attached in the illustrated instance to the underside of the guideway or ramp 40. More specifically, there is a spring hinge 82 having leaves 84 and 86. The leaf 84 is fastened or secured to the underside of the guideway or ramp 40 by means of bolts 88 that extend upwardly through a pair of holes 90 provided in the guideway or ramp 40, there being similarly spaced holes in the leaf 84 of the hinge 82. Additional bolts 92 fixedly attach the other leaf 86 to the strip 80. The leaf 84 has three knuckles labeled 94 thereon, whereas the leaf 86 has three knuckles labeled 96 thereon. The hinge 82 additionally includes a hinge pin in the form of a tension rod 100 having right angled end portions 102 and 104. Whereas the shank of the rod passes through the interleaved knuckles 94 and 96, the end portion 102 bears against the hinge leaf 84 and the end portion 104 against the leaf 86. All that need be appreciated is that the end portion 102 reactively engages the leaf 84 which is attached to the guideway 40 so that the end portion 104 presses against the leaf 86 which is attached to the strip 80 to bias the strip 80 upwardly or counterclockwise as viewed in FIGS. 1 and 2.

Although the hinge 82 is herein referred to as a spring hinge, it should be understood that the strip 80 can be somewhat resilient in and of itself, resembling a large leaf spring. However, for the sake of visual understanding, it has been decided to show a spring hinge. Although various spring hinges are available, the depicting of the tension rod 100 with its exposed end portions 102 and 104 should make the biasing action that is required more readily understood. What must be appreciated is the strip 70 is urged in a resilient fashion upwardly toward the underside of the bottom wall 34.

The resiliently attached strip 80 has a pair of holes 106, 108 that are in alignment with the previously mentioned holes 46 and 47 in the bottom wall 34 of the channel-shaped body 32 (and also in alignment with the upper holes 48 and 49). Attention is directed at this time to a U-shaped rod 110 having a bight portion 112 and upstanding pin or leg portions 114 and 116. It will be appreciated, especially from FIG. 6 that the pin portions 114, 116 extend upwardly through the holes 106 and 108. Suggestively, washers 118 can be welded to the lower ends of the pin portions 114 and 116. It is preferable that the U-shaped rod 110 be free to wobble or move slightly as the resiliently attached strip 80 flexes upwardly under the influence of the spring hinge 82.

What will be termed a tongue member 120 has a hole 122 therein for the accommodation of the previously referred to eye pin 26, as well as an arcuate recess 123 for the accommodation of the end portion of the trigger member 75; the role of the downwardly facing recess 123 will be better understood from the operational description that will hereinafter be given. The tongue member also has two longitudinally offset notches 124 and 126, one of the notches being in one side edge and the other notch in the opposite edge of the member 120. The reason for employing the notches 124 and 126, in contradistinction to utilizing holes, is that the tongue member 120 can be made narrower than otherwise. It should be appreciated, though, that the notches 124 and 126 are located so as to be in registry with the holes 46 and 47 in the bottom wall 34 (and also in registry with the holes 48 and 49 in the flanges 38) so that the pin portions 114 and 116 will extend upwardly into the notches 124 and 126 but only when the strip 80 is permitted to flex upwardly. Until then, the trigger mechanism 60 flexes the strip 80 downwardly, as can be seen in FIG. 1.

The tongue member 120 may be pulled by a cable 128 that extends to a winch (not shown) that is readily accessible to the operator of whatever vehicle is towing the implement in order that the operator need not demount from the towing vehicle during the actual coupling. It will be appreciated that a winch, even though not illustrated, has been mentioned for reasons of facile understanding. In this regard, it is contemplated that the cable 128 can be entrained about laterally spaced pulleys appropriately located at the rear of the towing vehicle, so that when the other end of the cable, after being guided about such pulleys, is attached to the vehicle to be towed, the operator need only make a sharp turn to the right or left, as the case may be, to effect the coupling. In the present situation, a cable anchor in the form of an axially drilled sleeve 130 is fixedly secured to the upper side of the tongue member 120, such as by welding. By means of a set screw 132, which is threadedly received in a tapped hole in the sleeve 130, one end of the cable 128 can be securely anchored or attached to the tongue member 120. The cable 128, as already indicated, extends forwardly so that it is readily accessible at its forward end to the operator without the operator being compelled to leave his seat on the towing vehicle during the coupling action.

Having presented the foregoing description, it is believed that the manner in which my hitch 30 functions should be understood. Nonetheless, a brief operational sequence will be of additional benefit, it is believed. In this regard, it will be recognized that the mobile field tank apparatus 16 is only illustrative of one implement or trailer that can be towed with my hitch 30. Therefore, in preparation for towing the apparatus 16, the operator or user of my hitch 30 first inserts the eye pin 26 downwardly through the holes in the clevis 24 and the hole 122 in the tongue member 120. It should be recognized that the cable 128 is of sufficient length so that an adequate portion thereof can be payed out to provide enough slack in order that the tongue member 120 can be readily manipulated by the operator into a positional relation such that the pin 26 can be inserted through the holes in the clevis 24, and, of course, through the hole 122 in the tongue member 120. The distinct advantage at this stage is that the towed implement, whatever it may be, does not have to be aligned with whatever apparatus is doing the towing. Usually, the implement, such as the tank apparatus 16 when loaded, cannot be manually moved by a single person into the most appropriate relation with the towing or traction vehicle in order that the two vehicles can be readily hitched to each other. It frequently takes time to maneuver the traction vehicle into position, although the engine of the traction vehicle relieves the greater of any manual effort; however, when an intervening vehicle such as the cultivator 10 is involved the aligning tasks becomes even more difficult.

After the operator has inserted the pin 26 in the manner described above, he can then seat himself upon the towing vehicle, either on the cultivator 10 or the tractor (not shown) that is to pull the cultivator 10. Once having seated himself, all that the operator need do is to pull the cable 128 by means of the winch or pulley arrangement (neither of which is shown) which action advances the tongue member 120, first from the position in which it appears in FIG. 1 to an intermediate or approaching position just prior to that pictured in FIG. 2. Continued reeling in, so to speak, of the cable 128 causes the tongue member 120 to ride up the flared guideway or ramp 40 and then slide along the upper surface of the bottom wall 34 of the channel-shaped body 32.

Figure 7:
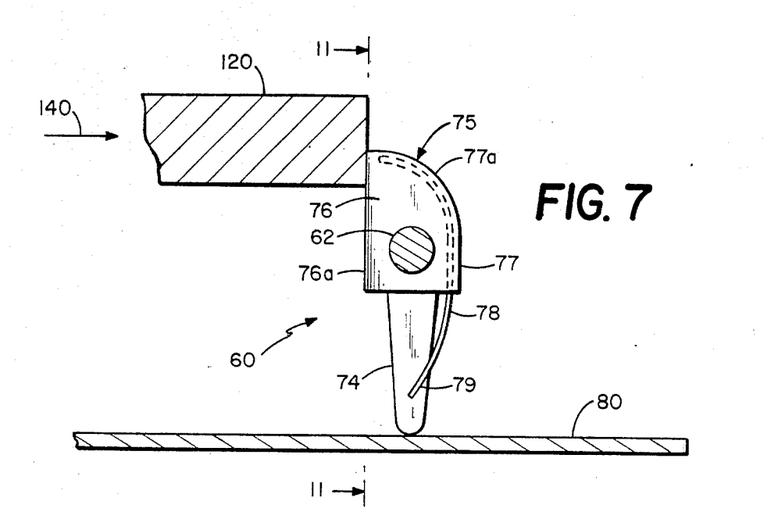
FIG. 7 is a diagrammatic view illustrating the tongue as it approaches the trigger mechanism.
Figure 8:
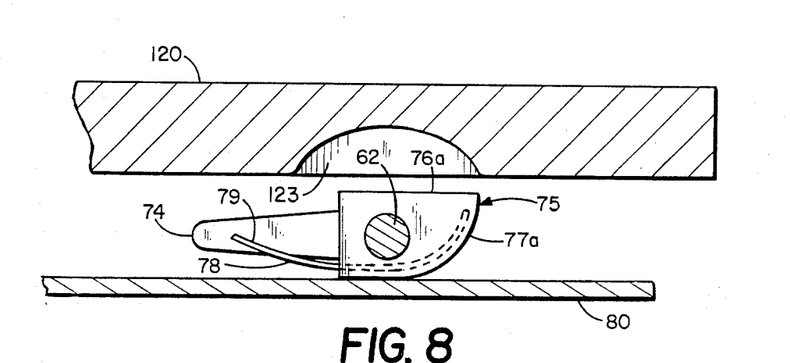
FIG. 8 is a view corresponding to FIG. 7 but after the trigger mechanism has been tripped by the forward end of the trigger to effect coupling of the hitch.

As it progresses along the upper side of the bottom wall 34 in the direction of arrow 140 (see FIG. 7), it soon reaches the trigger mechanism 60. It should be emphasized that FIG. 7 is only a diagrammatical portrayal of what is occurring. Upon reaching the trigger mechanism 60, the forward end of the tongue member 120 then strikes the pivotally mounted member 75, more specifically the straight edges 76a belonging to the laterally spaced side walls 76, with the consequence that the member 75 is rotated from its twelve o'clock position (see FIG. 7) into a three o'clock position (see FIG. 8). During this 90° rotation of the member 75, the member 74 is caused to rotate through 90° from its six o'clock position (FIG. 7) into a nine o'clock position (see FIG. 8). This occurs because the lower edge of the curved wall 77 acts against the member 74, doing so by pressing the leaf spring tightly against the member 74. This causes the trigger member 75 to be rotated or pivoted in a clockwise direction from that in which it appears in FIG. 7 (also FIG. 1) to the position in which it appears in FIG. 8 (also FIG. 2).

As illustrated in FIGS. 1 and 7, the actuating member 75 is extending downwardly, thereby causing the resiliently attached strip 80 to be flexed downwardly. The operator, when inserting the pin 26, makes sure that the trigger mechanism 60 is cocked, so to speak, so that the strip 80 is forcibly flexed downwardly to lower the U-shaped rod 110, more specifically to retract the pin portions 114 and 116 to allow passage of the tongue member 120 as it is pulled forwardly by means of the cable 128. The first arm or handle 64 enables the operator to rotate the shaft 62 so that the members 74 and 75 are initially oriented in a perpendicular relationship with the bottom wall 34 of the channel-shaped body 32. It should be remembered that the member 74 is fixedly mounted on the shaft 62, whereas the member 75 is pivotally mounted on the shaft 62. However, at this time, the two members 74, 75 are in a 180° or straight-line relationship with each other, biased into such relation by the leaf spring 78.

It is due to the lack of any interference at this time, as far as the pins 114 and 116 are concerned, that the tongue member 120 can advance forwardly so as to strike or engage the member 75, as diagrammatically illustrated in FIG. 7. It is when the member 75 is engaged by the advancing tongue member 120 that the actuating member 74 is rotated or pivoted through 90° so that it is then oriented in a generally parallel relationship with the bottom wall 34, as is evident in FIGS. 2 and 8. It is then that the resiliently attached strip 80 can move upwardly, being free to do so because the actuating member 74 is no longer forcing the forward end of the strip 80 downwardly.

The upward flexing of the strip 80 is responsible for causing the pin portions 114, 116 to project upwardly through the holes 46 and 47 in the bottom wall 34, upwardly through the notches 124 and 126 provided in the marginal edges of the tongue member 120 and into the holes 48 and 49 in the flanges 38. It is at this time that the downwardly facing recess 123 in the bottom of the tongue 120 is in registry with the trigger mechanism 60; more specifically, the recess 123 overlies the trigger member 75.

Once the pin portions 114 and 116 are received in the notches 124 and 126 the coupling of my hitch 30 has been completed. After this, when the cultivator 10 moves forwardly, the tongue member 120, which is now prevented from moving rearwardly by reason of the pin portions 114 and 116, is literally latched in place so that the apparatus or implement 16 is pulled forwardly when the cultivator 10 moves forwardly. It should be discerned, however, that the cable 128 does not have to shoulder any of the pulling force, for the tongue member 120 is prevented from moving relative to the channel-shaped body 32 by virtue of engagement of the pin portions 114 and 116 in the notches 124, 126. Hence, the cable 128 can be fairly lightweight and rather flexible in that all that it need do is intially pull the trailing apparatus 16 forwardly in order to complete the coupling procedure. Also, the set screw 132 is no longer needed as far as any towing action is concerned, for it is likewise relieved of any stress or tension. Thus, the set screw 132 does not have to grip the end of the cable 138 that is received in the anchor sleeve 130 as firmly as it would if having to transmit all or some of the towing force.

When the hitch 30 is to be uncoupled, the operator need only twist or rotate the handle 64 back to the position in which it appears in FIG. 1, causing the actuating member 74 to again flex the strip 80 downwardly with the consequence that the pin portions 114 and 116 are withdrawn or retracted from the notches 124 and 126. It must be remembered that the actuating member 74 is fixedly attached to the shaft 62. The handle 64, of course, rotates the shaft 62.

At this time attention is again directed to the recess 123 formed in the underside of the tongue 120.

Figure 9:
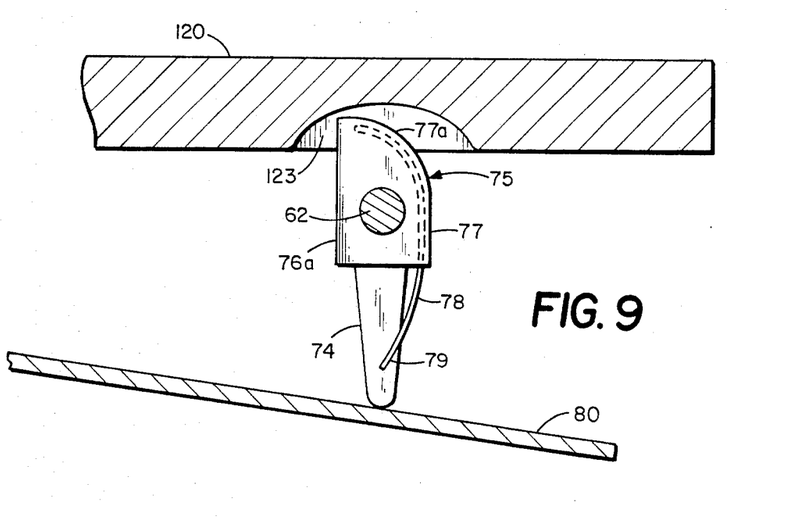
FIG. 9 shows the trigger mechanism in the relation it assumes to allow uncoupling of the hitch.
Figure 10:
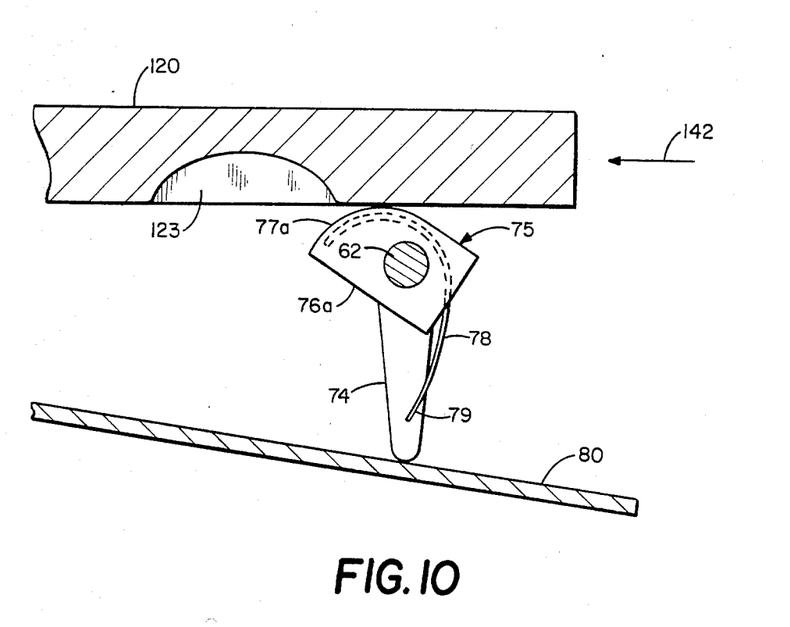
FIG. 10 illustrates a transitional condition of the trigger mechanism as the tongue moves rearwardly during the uncoupling process.
Figure 11:
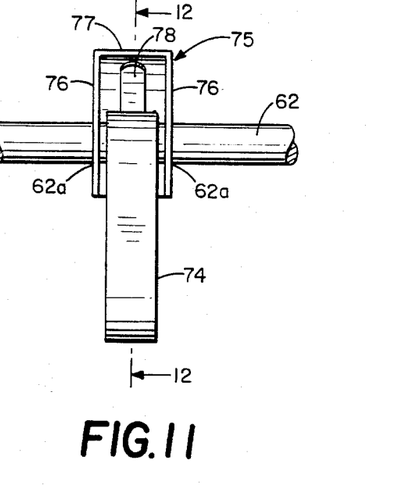
FIG. 11 is a front elevational view of the trigger mechanism taken in the direction of line 12—12 of FIG. 7.
Figure 12:
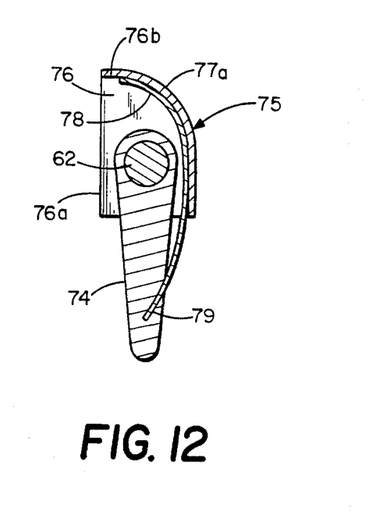
FIG. 12 is a sectional view of the trigger mechansim taken in the direction of line 12—12 of FIG. 11.

The recess 123, it is to be noted, is located forwardly of the notches 124 and 126 a distance such that when the pin portions 114, 116 are received in the notches 124, 126, then the recess 123 is in registry with, that is directly above, the member 75 of the trigger mechanism 60. Stated more completely, the actuating member 74, being fixedly mounted on the shaft 62, rotates through 90° in a counterclockwise direction from its nine o'clock position (FIG. 8) back into its six o'clock position (FIG. 9). In doing so, the actuating member 74 is forced against the spring 78, and the spring 78 in turn against the inside surface of the rear wall 77, causing the trigger member 75 to return to its twelve o'clock position (FIG. 9). The downwardly facing recess 123 permits this to happen. At the same time, the downward flexing of the strip 80 is instrumental in causing downward movement of the pin portions 114 and 116 in that they are integral with the U-shaped rod 110 (and the U-shaped rod 110 is carried on the strip 80).

Therefore, when the pin portions 114 and 116 are retracted, the tongue 120 is free to slide rearwardly from the channel-shaped body 32. During this course of events, however, the forward edge of the recess 123 rides against the curved wall 77 belonging to the member 75, camming the member 75 into the angled position in which it appears in FIG. 10. It can do this because the leaf spring 78 yields sufficiently and the member 75 is free to rotate on the shaft 62. This allows the tongue 120 to pass rearwardly in the direction of the arrow 142 (FIG. 10) without interference from the member 75. As soon as the forward or right end of the tongue member 120 has moved sufficiently rearwardly to clear the member 75, the member 75 springs back to its twelve o'clock position of FIG. 7, doing so under the influence of the leaf spring 78. In other words, the member 75 returns to the position in which it appears in FIG. 7 (and also FIG. 1), and the trigger mechanism 60 is in this way conditioned or cocked in preparation for the next coupling action.

I claim:

1. A trailer hitch comprising a channel-shaped member having an opening therein, a tongue member having an opening therein registrable with the opening in said channel-shaped member when said tongue member is received in said channel-shaped member, elongated resilient means attached at one end to said channel-shaped member and having its other end biased toward said channel-shaped member, pin means carried on said resilient means for movement relative to the opening in said channel-shaped member into an obstructive engagement with the opening in said tongue member, and trigger means including a first means for normally engaging said resilient means to overcome the bias of said resilient means in one position and for moving said pin means into a non-obstructive relation with the opening in said tongue member and including a second means connected to said first means and engageable by said tongue member for moving said first means into a second position to allow the other end of said resilient means to move toward said channel-shaped member and to cause said obstructive engagement of said pin means with said opening in said tongue member.

2. A trailer hitch comprising a channel-shaped member having an opening therein, a tongue member having an opening therein registrable with the opening in said channel-shaped member when said tongue member is received in said channel-shaped member, elongated resilient means attached at one end to said channel-shaped member and having its other end biased toward said channel-shaped member, pin means carried on said resilient means and movable relative to the opening in said channel-shaped member and movable into an obstructive engagement with the opening in said tongue member, and trigger means including a first member normally engaging said resilient means to overcome the bias of said resilient means in one position to move said pin means into a non-obstructive relation with the opening in said tongue member and including a second member pivotally connected to said first member and engageable by said tongue member to move said first member into a second position to allow the other end of said resilient means to move toward said channel-shaped member and to cause said obstructive engagement of said pin means with said opening in said tongue member.

3. A trailer hitch in accordance with claim 2 in which said tongue member has a recess for receiving a portion of said second member when said pin means is in its said obstructive engagement.

4. A trailer hitch in accordance with claim 3 including a leaf spring biasing said second member into a substantially straight line relative with said first member, said recess having a surface portion for engaging and camming said second member into an angled relation with said first member to allow withdrawal of said tongue member from said channel-shaped member when said first member is in its said one position.

5. A trailer hitch comprising a channel-shaped body having a bottom wall and laterally spaced side walls, said bottom wall having an elongated slot and first and second openings therein, a trigger mechanism rotatably mounted to said bottom wall so that, when said trigger mechanism is oriented in a first angular position, a first portion thereof extends upwardly through said slot and a second portion thereof extends downwardly, a strip member resiliently anchored at one end thereof with respect to said bottom wall and at a location such that the second portion of said trigger mechanism flexes the opposite end of said strip member downwardly away from said bottom wall, first and second longitudinally offset, upwardly directed pins carried on said strip member at locations so as to extend upwardly through said openings when said strip member is permitted to flex upwardly by rotation of said trigger mechansim from its said first angular position into a second angular position that is generally parallel to said bottom wall, and a tongue member having one end engageable with said first portion of said trigger mechanism when said tongue member is moved in a forward direction toward said trigger mechanism to rotate said trigger mechanism from its said first angular position into its said second angular position to permit said strip member to flex upwardly, said tongue member having first and second longitudinally offset notches in opposite edges thereof for receiving therein the upper ends of said pins when said strip member has flexed upwardly to prevent rearward movement of said tongue member.

6. A hitch in accordance with claim 5 in which said pins are integral end portions of a U-shaped rod having a bight portion extending beneath said strip member.

7. A trailer hitch comprising a channel-shaped body having a bottom wall and laterally spaced side walls, said bottom wall having an elongated slot and an opening therein, a strip member resiliently anchored at one end to one end of said bottom wall, a pin mounted substantially vertically to an upper side of said strip member, a trigger means rotatably mounted to said bottom wall for movement to a first angular position for extending a first trigger portion upwardly through said slot and a second trigger portion downwardly to contact said stripmember and cause it to flex downwardly to thereby cause said pin to pull out of said opening into which it normally protrudes, and for movement to a second angular position in which the first and second trigger portions lie generally parallel to said bottom wall, and a tongue means for engaging with said first trigger portion when said tongue means is moved in a forward direction toward said trigger means to thereby rotate said trigger means from its said first angular position into its said second angular position to permit said strip member to flex upwardly, said tongue means having an opening means for receiving therein the upper end of said pin when said strip member has flexed upwardly to prevent rearward movement of said tongue means.

8. A trailer hitch in accordance with claim 7 in which the opening in said tongue means constitutes a notch in one edge thereof.

9. A hitch in accordance with claim 8 which said bottom wall has a second opening therein and said tongue means has a second notch in the opposite edge thereof, and a second upwardly directed pin is attached to said strip member at a location so as to extend upwardly through said second opening into said second notch when said strip member is permitted to flex upwardly.

10. A hitch in accordance with claim 7 including means for guiding said tongue means into said channel-shaped body.

11. A hitch in accordance with claim 10 including a cable means for pulling said tongue means through said guide means in said forward direction through a longitudinal portion of said channel-shaped body to cause the forward end of said tongue member to engage and rotate said trigger mechanism.

12. A hitch in accordance with claim 7 in which said trigger means includes a transverse shaft, a trigger member free to pivot on said shaft to provide said first trigger portion and an actuating member fixedly mounted on said shaft to provide said second trigger portion.

13. A hitch in accordance with claim 12 in which said trigger means includes a leaf spring biasing said trigger member into a generally straight-line relationship with said actuating member.

14. A hitch in accordance with claim 13 in which said tongue means has a downwardly facing recess to accommodate said trigger member and to permit rotation of said trigger means.

15. A hitch in accordance with claim 14 in which said trigger member has a wall having a curved portion and said recess has a curved surface, said curved surface camming against the curved portion of said wall when said tongue means is moved rearwardly to produce an angular relation of said trigger member relative to said actuating member that is generally parallel to said bottom wall and thereby permit withdrawal of said tongue means from said channel-shaped body.

16. A hitch in accordance with claim 15 in which said trigger member wall has a portion acted against by said actuating member to rotate said trigger means from its said first position into its said second position.

17. A trailer hitch comprising elongated means having a first opening therein, tongue means movable longitudinally relative to said elongated means and having a second opening therein registerable with said first opening when said tongue means is in one longitudinal position relative to said elongated means, a leaf spring attached at one end to said elongated means and having its other end biased in a direction toward said elongated means, a pin means carried on said leaf spring adjacent said other end thereof for normally protruding through said first opening and into an obstructive engagement with said second opening when said tongue means is in its said one longitudinal position such that said second opening is in registry with said first opening to then prevent movement of said tongue means relative to said elongated means, and a trigger mechanism rotatably mounted on said elongated means including oppositely directed first and second member means for normally extending perpendicularly to said elongated means but being rotatable through approximately 90 degrees so as to be approximately parallel to said elongated means, said second member means normally engaging said leaf spring when in its said perpendicular position to flex said leaf spring so as to move said pin means out of obstructive engagement with said second opening and said first member means when in its said perpendicular position being engageable by said tongue means when said tongue means is moved longitudinally toward said trigger mechanism, said tongue means further arranged for engaging and rotating said first member means of said trigger mechanism into its said parallel relationship with said elongated means when said tongue means is moved longitudinally of said elongated means and concurrently causing said second opening to be in registry with said first opening so that said pin is then urged through said first opening into said obstructive engagement with said second opening.

* * * * *